DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 713

T869,010

PEPTIZING EPIHALOHYDRIN POLYMERS WITH PEROXIDES

William D. Willis, Wilmington, Del., assignor to Hercules Incorporated, Wilmington, Del., a corporation of Delaware

Continuation of application Ser. No. 679,213, Oct. 30, 1967. This application May 16, 1969, Ser. No. 825,386

Int. Cl. C08g *23/06*

U.S. Cl. 260—2

No Drawing. 17 Pages Specification

The processability of epihalohydrin polymers can be improved without degradation by admixing the polymer with a small amount of organic peroxide for a short period of time at an elevated temperature, thus lowering the viscosity of the polymer. The organic peroxide used will be benzoyl peroxide, a di(aralkyl) peroxide having the general formula

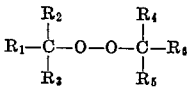

where $R_1$ and $R_6$ are aryl groups and $R_2$, $R_3$, $R_4$ and $R_5$ are hydrogen or alkyl groups of less than four carbon atoms, or a diperoxide having the general formula

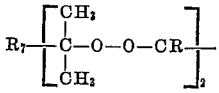

where $R_7$ is an arylene or alkylene group and —CR represents a tertiary alkyl group containing from 4 to 12 carbon atoms.